(12) United States Patent
Gulbransen et al.

(10) Patent No.: US 7,586,074 B2
(45) Date of Patent: Sep. 8, 2009

(54) MULTI-MODE HIGH CAPACITY DUAL INTEGRATION DIRECT INJECTION DETECTOR INPUT CIRCUIT

(75) Inventors: David J. Gulbransen, Santa Barbara, CA (US); Christopher L. Fletcher, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 1459 days.

(21) Appl. No.: 10/368,121

(22) Filed: Feb. 17, 2003

(65) Prior Publication Data

US 2004/0169753 A1    Sep. 2, 2004

(51) Int. Cl.
- H01L 27/00 (2006.01)
- H04N 5/217 (2006.01)
- H04N 3/14 (2006.01)

(52) U.S. Cl. ............... 250/208.1; 348/241; 348/297

(58) Field of Classification Search ............... 250/208.1, 250/208.2; 348/241, 302, 308, 297, 298, 348/306

See application file for complete search history.

(56) References Cited

U.S. PATENT DOCUMENTS

| | | | |
|---|---|---|---|
| 4,978,872 A | 12/1990 | Morse et al. | 307/490 |
| 5,043,820 A | 8/1991 | Wyles et al. | 358/213.28 |
| 5,892,540 A * | 4/1999 | Kozlowski et al. | 348/300 |
| 6,028,299 A * | 2/2000 | Hirama et al. | 250/208.1 |
| 6,078,037 A | 6/2000 | Booth, Jr. | |
| 6,121,843 A | 9/2000 | Vampola et al. | 330/308 |
| 6,373,050 B1 * | 4/2002 | Pain et al. | 250/261 |
| 6,518,558 B1 * | 2/2003 | Bohm et al. | 250/208.1 |
| 7,286,174 B1 * | 10/2007 | Weale et al. | 348/308 |
| 2003/0067547 A1 * | 4/2003 | Morris et al. | 348/273 |

FOREIGN PATENT DOCUMENTS

| | | |
|---|---|---|
| EP | 0553406 | 8/1993 |
| EP | 1237357 A | 9/2002 |

OTHER PUBLICATIONS

Yadid-Pechet, O., et al., "Wide Intrascene Dynamic Range CMOS APS Using Dual Sampling", IEEE Transactions on Electron Devices, vol. 44, No. 10, Oct. 1997.

Decker, S. et al., "A 256 X 256 CMOS Imaging Array with Wide Dynamic Range Pixels and Column-Parallel Digital Output", IEEE Journal of Solid-State Circuits, vol. 33, No. 12, Dec. 1998.

Muramatsu, Yoshinori et al., "A Signal-Processing CMOS Image Sensor Using a Simple Analog Operation" IEEE Journal of Solid-State Circuits, vol. 38, No. 1, Jan. 2003.

* cited by examiner

*Primary Examiner*—Thanh X Luu
(74) *Attorney, Agent, or Firm*—Leonard A. Alkov (57) ABSTRACT

A unit cell (20) is disclosed that has an input node for coupling to an output of a detector (D1) of electromagnetic radiation, such as IR or visible radiation. The unit cell includes a first capacitor ($C_{intA}$) switchably coupled to the input node for receiving a charge signal from the detector, and for integrating the charge signal during a first integration period, as well as a second capacitor ($C_{intB}$) switchably coupled to the input node for integrating the charge signal during a second integration period. The unit cell further includes an output multiplexer (32, 34) for selectively coupling the first capacitor and the second capacitor to an output signal line (38) during respective charge signal readout periods. In the preferred embodiment a duration of the first integration period is one of greater than or less than the second integration period, and the first integration period is one of non-overlapping or overlapping with the second integration period, and vice versa. The first integration period can be interleaved with the second integration period, or vice versa.

12 Claims, 7 Drawing Sheets

MULTI-MODE HIGH CAPACITY DUAL INTEGRATION DIRECT INJECTION DETECTOR INPUT CIRCUIT

TECHNICAL FIELD

This invention relates in general to detectors of electromagnetic radiation and, more specifically, this invention pertains to unit cell circuitry for integrating electrical charge generated by a detector of visible or infrared radiation (IR).

BACKGROUND

In U.S. Pat. No. 5,043,820, issued on Aug. 27, 1991, entitled "Focal plane array readout employing one capacitive feedback transimpedance amplifier for each column", Wyles et al. disclose a readout circuit for use with a focal plane array that employs a single transistor in each unit cell and a single capacitive feedback transimpedance amplifier (CTIA) to process the outputs of each column of detector elements of the array. The capacitive feedback transimpedance amplifiers extract the signals associated with the pixels along a particular row of the array. The disclosed invention permits high performance readouts to be constructed with little circuitry in the unit cells. For example, only a single minimum sized transistor switch is required in each unit cell to perform readout and reset functions for the array.

Figure 1:
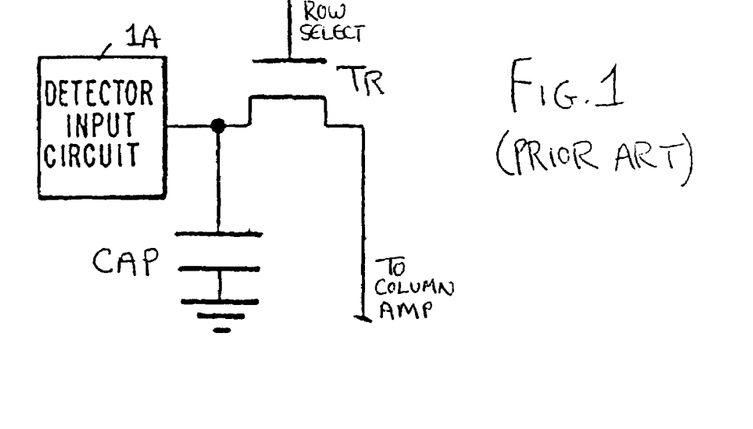
FIG. 1 is circuit diagram of a conventional unit cell circuit having a single integration capacitor.
Figure 2:
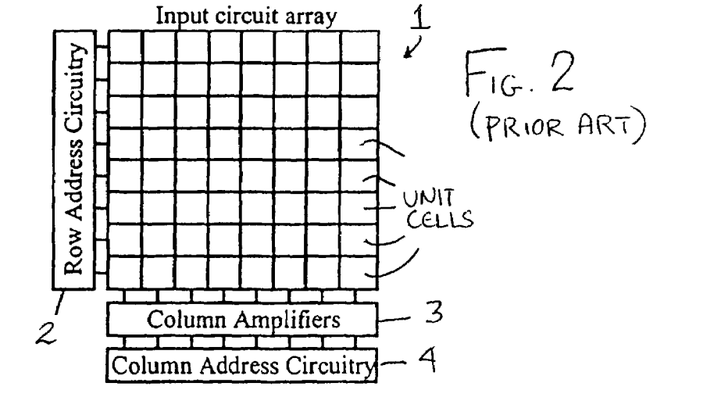
FIG. 2 is a block diagram of a conventional two dimensional imager containing an input circuit array, row address circuitry, column amplifiers and column address circuitry.

Referring to FIGS. 1 and 2, in a disclosed embodiment the readout circuit includes an array of unit cells 1, where each unit cell 1 includes a detector input circuit 1A, a transistor (TR) and a single charge storage capacitor (CAP). Row address circuits 2 are coupled to the cells in each row of the array 1, and a plurality of capacitive feedback transimpedance amplifiers 3 are coupled to the cells in each column of the array. The amplifiers process charge derived from the detector elements and stored in the charge storage capacitor (CAP) of each unit cell 1. Column multiplexing circuits multiplex the output signals provided by each of the amplifiers. Column address circuits 4 are coupled to the column multiplexing circuits which couple output signals from each of the multiplexer circuits as the output from the readout circuit.

The charge mode readout made possible by using the circuit shown in FIG. 1 is achieved by using a CTIA at each column output. The CTIA operates to hold the vertical busline connecting a column of unit cells 1 at a virtual ground, while extracting the charge from the unit cell integration capacitors. The charge mode output, direct injection input circuit generally provides the largest integration storage capacity in the smallest unit cell circuit area. General reference with regard to CTIAs can be made, as examples, to U.S. Pat. No. 4,978,872, "Integrating Capacitively Coupled Transimpedance Amplifier", Morse, Gaalema, Keimel and Hewitt, and to U.S. Pat. No. 6,121,843, "Charge Mode Capacitor Transimpedance Amplifier", Vampola and Hewitt.

While well suited for use in many important applications, it has been found that the unit cell design illustrated in FIG. 1 does not lend itself to implementing a true "snapshot integrate-while-read" capability. The use of snapshot integration is desirable for operation in highly dynamic imaging systems to prevent the creation of image artifacts that can be generated by non-simultaneous scene-derived charge integration, sometimes referred to as "rolling frame integration".

This problem is related to a problem that can be experienced by IR sensors that operate in an IRST (IR Search and Track) mode of operation. In the IRST mode the sensors must accommodate a large dynamic range. A typical response to the wide dynamic range requirement is to obtain two signal samples that are closely-spaced in time with different integration or exposure times, e.g., a low gain sample with a short integration time and a high gain sample with a long integration time. In the conventional circuit having a single integration well per detector input, as in FIG. 1, the two integration times are separated by a full readout frame time (e.g., tens of milliseconds when operating with a 30 Hz frame rate). As can be appreciated, when the scene radiation is rapidly changing this amount of delay can be objectionable, and may result in ambiguous scene data being generated.

In an attempt to provide a snapshot integrate-while-read capability with the conventional unit cell circuitry it has been known to add a sample/hold capacitor to each unit cell. While allowing snapshot integration, this approach also attenuates the input signal, and reduces the amount of charge that can be accumulated. Also, since charge division occurs between the integration capacitor and the sample/hold capacitor, a non-uniformity in the ratio of these two capacitors can result in an undesirable variation in gain over the two-dimensional array of unit cells.

SUMMARY OF THE PREFERRED EMBODIMENTS

The foregoing and other problems are overcome, and other advantages are realized, in accordance with the presently preferred embodiments of these teachings.

A unit cell is disclosed that has an input node for coupling to an output of a detector of electromagnetic radiation, such as IR or visible radiation. The unit cell includes a first capacitor switchably coupled to the input node for receiving a charge signal from the detector, and for integrating the charge signal during a first integration period, as well as a second capacitor switchably coupled to the input node for receiving a charge signal from the detector and for integrating the charge signal during a second integration period. The first capacitor has a value that is one of equal to or different than a value of the second capacitor. The unit cell further includes an output multiplexer for selectively coupling the first capacitor to an output signal line during a first charge signal readout period, and for selectively coupling the second capacitor to the output signal line during a second charge signal readout period. The first and second integration periods, and the first and second readout periods, occur within one frame period. In the preferred embodiment a duration of the first integration period is one of greater than or less than the second integration period.

The first integration period is one of non-overlapping or overlapping with the second integration period, and vice versa, and the first integration period can be interleaved with the second integration period, or vice versa.

In one mode of operation the first and second capacitors are switchably coupled to the input node during an integration period for simultaneously receiving and integrating the same charge signal from the detector.

In the preferred embodiment of this invention the unit cell is one of a plurality of unit cells of an array of unit cells, where the array is a two dimensional array arranged in rows and columns, and where the output signal line comprises a column output signal line. In the preferred embodiment the column output signal line is coupled to an input of a capacitive transimpedance amplifier for converting a readout charge signal to a voltage. A threshold detector may be employed for detecting whether a readout charge signal exceeds a threshold indicating a saturation condition for enabling the other readout charge signal to be selected for use.

The unit cell further includes switching circuitry for selectively resetting one or more of the input node and the first and second capacitors by selectively coupling one or more of the input node and the first and second capacitors to a reset voltage.

Also disclosed is an array of unit cells, where each unit cell includes an input node for coupling to an output of a detector of electromagnetic radiation; a first capacitor switchably coupled to the input node for receiving a charge signal from the detector and for integrating the charge signal during a high gain integration period; a second capacitor switchably coupled to the input node for receiving a charge signal from the detector and for integrating the charge signal during a lower gain integration period; and an output circuit for coupling the first capacitor to a first output signal line during a charge signal readout period, and for coupling the second capacitor to a second output signal line during the charge signal readout period. The array further includes a first amplifier having an input coupled to the first output signal line, a second amplifier having an input coupled to the second output signal line, a comparator for comparing an output of the first amplifier to a saturation threshold signal, and an output multiplexer, coupled to an output of the comparator, for selecting one of the output of the first amplifier or the output of the second amplifier to be coupled to further circuitry.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 4-7 each illustrate the use of the DI input circuit of FIG. 3 in one of a plurality of operational modes over an exemplary 30 Hz (33.3 microsecond) frame time; where

DETAILED DESCRIPTION OF THE PREFERRED EMBODIMENTS

Figure 3:
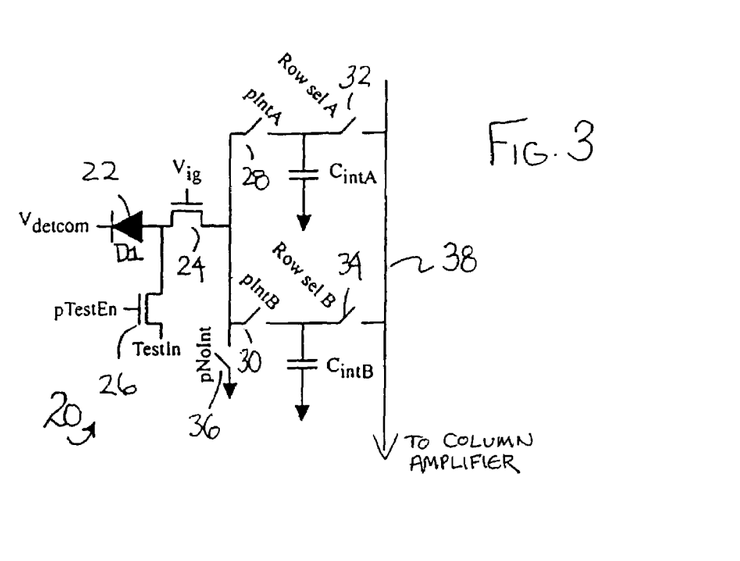
FIG. 3 is a circuit diagram of a high capacity direct injection (DI) input circuit in accordance with an embodiment of this invention, that contains two integration capacitors for enabling true snapshot integrate-while-read capability.

FIG. 3 is a circuit diagram of a high capacity, charge mode DI input unit cell circuit 20 in accordance with an embodiment of this invention. The unit cell circuit 20 is constructed to include a plurality of integration capacitors, such as two in the presently preferred embodiment, designated $C_{intA}$ and $C_{intB}$. A radiation detector, shown as a photovoltaic diode (D1) 22, also referred to herein as a detector 22, may or may not be located in the unit cell 20. In general, the unit cell circuit 20 can be used with a monolithic detector 22 (where the detector and unit cell circuit share the same substrate), or with a hybrid detector 22 (where the detector and unit cell circuit are on different substrates that are interconnected by, for example, Indium or solder bumps, or by plated metal vias).

In the illustrated embodiment the anode of D1 is connected to a voltage $V_{detcom}$ and the cathode is connected to the unit cell 20 via an input circuit embodied as a first transistor (an injection transistor) 24 that is driven by a signal $V_{ig}$. The signal $V_{ig}$ is adjusted to establish a suitable bias across the photovoltaic diode D1. The circuit node to which the cathode of D1 is connected is also connected to a second transistor 26 for inputting a test signal TestIn under control of signal pTestEn. This test-related circuitry and signals are not required for operation of the unit cell 20 of this invention, and are shown in FIG. 3 for completeness. The injection transistor 24 that is driven by the signal $V_{ig}$ is connected at an output side to third and fourth transistors 28 and 30 (pIntA and pIntB) that, when on, apply the input signal to $C_{intA}$ and $C_{intB}$ respectively. $C_{intA}$ and $C_{intB}$ are connected to a column output line 38 via fifth and sixth transistors, functioning as switches 32 and 34 (Row_selA and Row_selB), respectively, that provide an output multiplexer function for the unit cell 20. The output side of the first transistor 24, and the input sides of the third and fourth transistors 28 and 30, are also connected to a seventh transistor 36 (pNoInt) that is used for applying zero volts (circuit ground) to $C_{intA}$ and $C_{intB}$ for resetting same to a known potential. Note that the pNoInt transistor 36 may also be employed as an anti-bloom device for D1. While described as a p-channel transistor, an n-channel transistor could be used as well (as is the case for the other transistors).

In an illustrative and non-limiting embodiment of this invention the unit cell 20 is contained within a 25 micrometer square circuit area, and $C_{intA}$ and $C_{intB}$ are equal valued capacitors having a nominal value of about 740 femtofarad (fF). In this case each of $C_{intA}$ and $C_{intB}$ may store up to about $20.3 \times 10^6$ electrons of charge. In other embodiments $C_{intA}$ and $C_{intB}$ are not equal in value.

In a most basic mode of operation, and at the beginning of an integration period, both D1 and $C_{intA}$ and $C_{intB}$ are reset through the pNoInt transistor 36 to zero volts. Note that reset can also be accomplished through the two select transistors 32 and 34 via an optional reset transistor (not shown) that is attached to the column line 38. At the end of the reset operation, the pNoInt transistor 36 is opened, and the photocurrent generated by D1 integrates onto $C_{intA}$ and $C_{intB}$ through the closed pIntA and pIntB transistors 28 and 30, respectively. Note that only one of the pIntA and pIntB transistors 28 and 30 need be closed during the integration period, storing photocurrent on only one of $C_{intA}$ and $C_{intB}$. At the end of the integration period the pIntA and pIntB transistors 28 and 30 are opened, leaving the integrated charge stored on at least one of $C_{intA}$ and $C_{intB}$. The integrated signal charge is then read out row by row by turning on one or both of the row select transistors 32 and 34, thereby transferring the stored charge to the column line 38. The column line 38 is connected to the input of a one-per-column charge sensing amplifier which converts the charge signal to a proportional voltage, which can occur in the manner discussed in the above-referenced U.S. Pat. No. 5,043,820.

The unit cell 20 can be operated in a number of different modes in both an integrate-then-read (ITR) and an integrate-while-read (IWR) manner, as shown in FIGS. 4-7 and described in further detail below.

Figure 4:
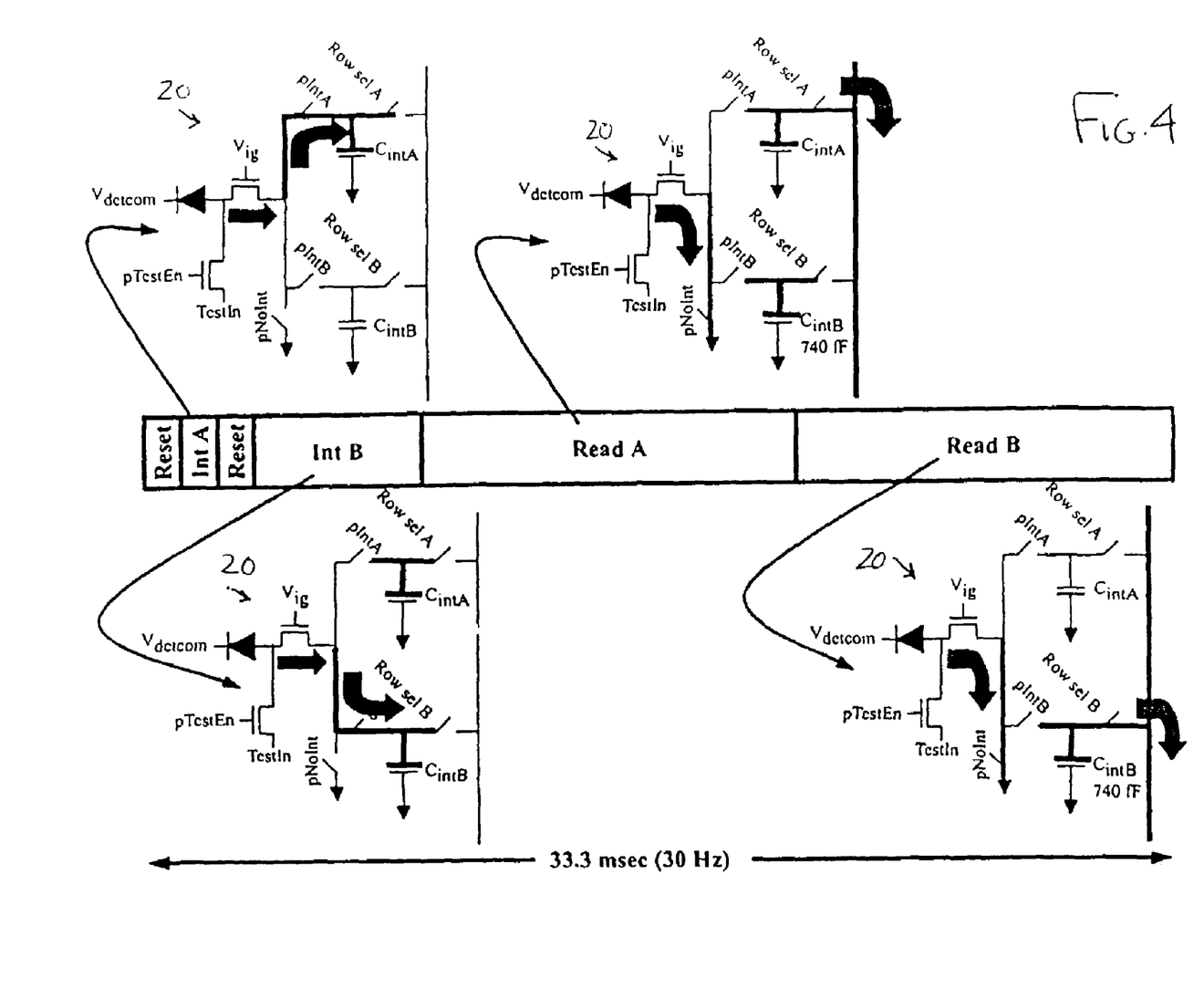
FIG. 4 is a diagram that illustrates the use of the DI input circuit of FIG. 3 in a minimal latency, dual integration integrate-then-read (ITR) mode of operation.

FIG. 4 is a diagram that illustrates the use of the DI input circuit of the unit cell 20 in a minimal latency, dual integration ITR mode of operation. This mode enables both long and short integration samples to be obtained with a minimal latency (e.g., less than about 10 microseconds) between samples. This mode thus advantageously reduces tracker-mode artifacts that could potentially occur if the first sample was required to be read out prior to taking the second sample, where a full frame delay (e.g., 33.3 milliseconds) would occur between the first and the second samples.

In the mode illustrated in FIG. 4, and after the initial reset period (where pNoInt is closed), transistor switch 28 is closed and transistor switch 30 is opened so that the photocurrent is first integrated onto $C_{intA}$ for a short period of time (e.g., 100 microseconds, a low gain sample). After a second (short) reset period (e.g., less than 100 microseconds), transistor 28 is opened and transistor 30 is closed to integrate the photocurrent on $C_{intB}$ for a longer period of time (e.g., less than about 5.3 milliseconds, a high gain sample). Having thus stored both the low and high gain charge samples, the output multiplexer is operated twice to first readout $C_{intA}$ (during period Read_A), and then readout $C_{intB}$ (during period Read_B). Note that during the readout period transistors 28 and 30 are open (off) and transistor switch 36 (pNoInt) is closed (on) for holding D1 reset. The cathode of D1 can be connected to, for example, five volts, assuming a five volt process and a detector diode having p-on-n polarity. It should be noted that this circuit will operate just as well with an n-on-p polarity diode, provided that the voltage polarity and the transistor types are reversed.

Figure 5:
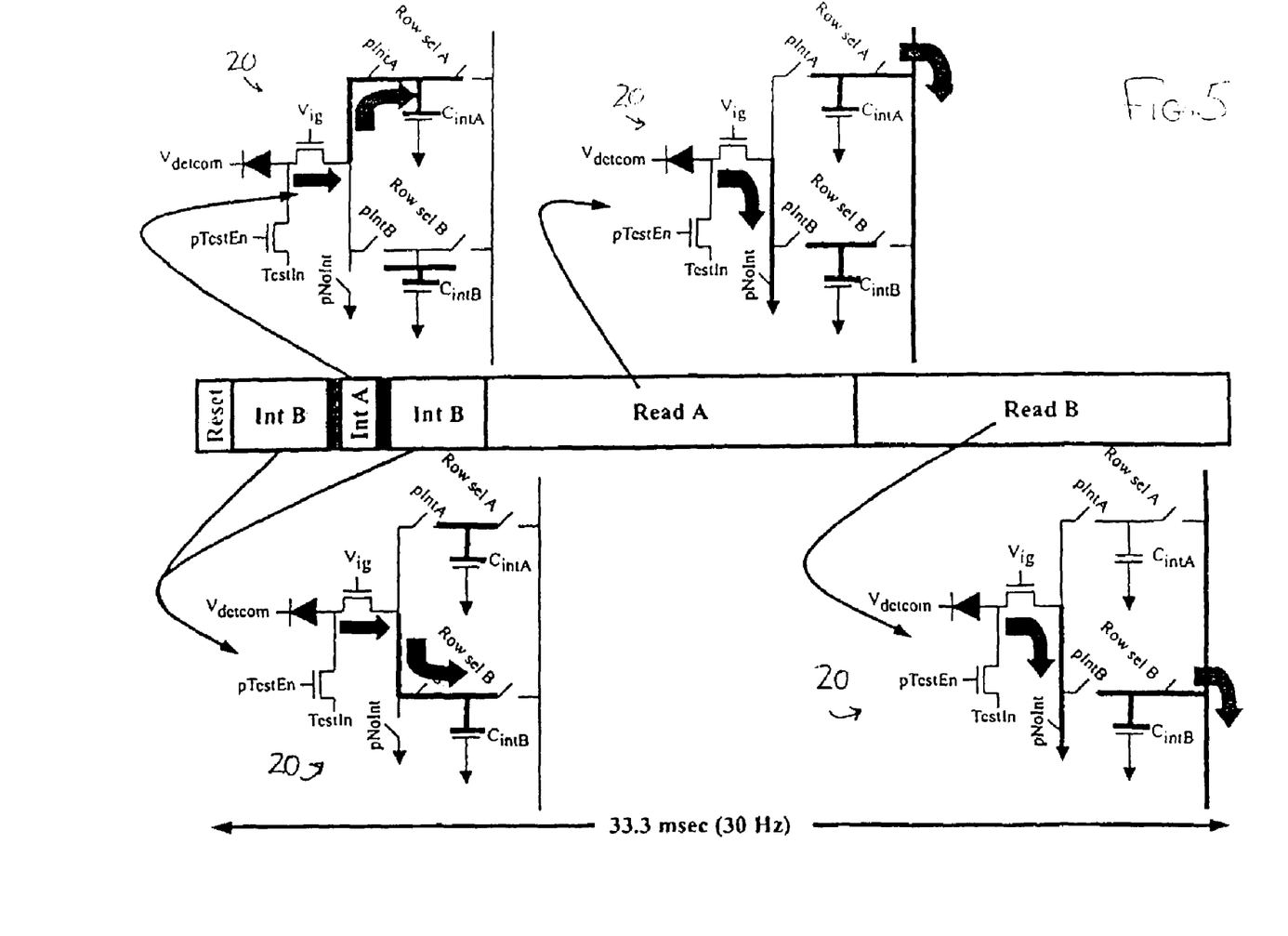
FIG. 5 is a diagram that illustrates the use of the DI input circuit of FIG. 3 in an interleaved (no latency), dual integration integrate-then-read mode of operation.

FIG. 5 is a diagram that illustrates the use of the DI input unit cell circuit 20 of FIG. 3 in an interleaved (no latency), dual integration ITR mode of operation. Note that this mode is similar to that shown in FIG. 4, except that the integration times are interleaved rather than being sequential. The longer integration time (the high gain sample) is actually split into two periods separated by the shorter integration time (the low gain sample). This allows both the long and the short integration samples to be made with essentially zero latency. In this embodiment the photocurrent is first integrated onto $C_{intB}$ for some portion, such as half, of the desired integration period. After an optional short reset period (e.g., less than about 10 microseconds) during which pIntA and pIntB transistors 28 and 30 are both open, and the pNoInt transistor 36 is closed (to clear the charge on the input node), transistor pIntA 28 is closed to integrate photocurrent onto $C_{intA}$ for a significantly shorter period of time. After another optional short reset period, photocurrent is again integrated onto $C_{intB}$, which still stores the photocurrent from the first integration period, for the remainder of the longer, high gain integration period. Having thus stored both the low and high gain charge samples, the output multiplexer is operated twice to first readout $C_{intA}$ (during period Read_A), and then readout $C_{intB}$ (during period Read_B), as was discussed above with respect to FIG. 4.

Figure 6:
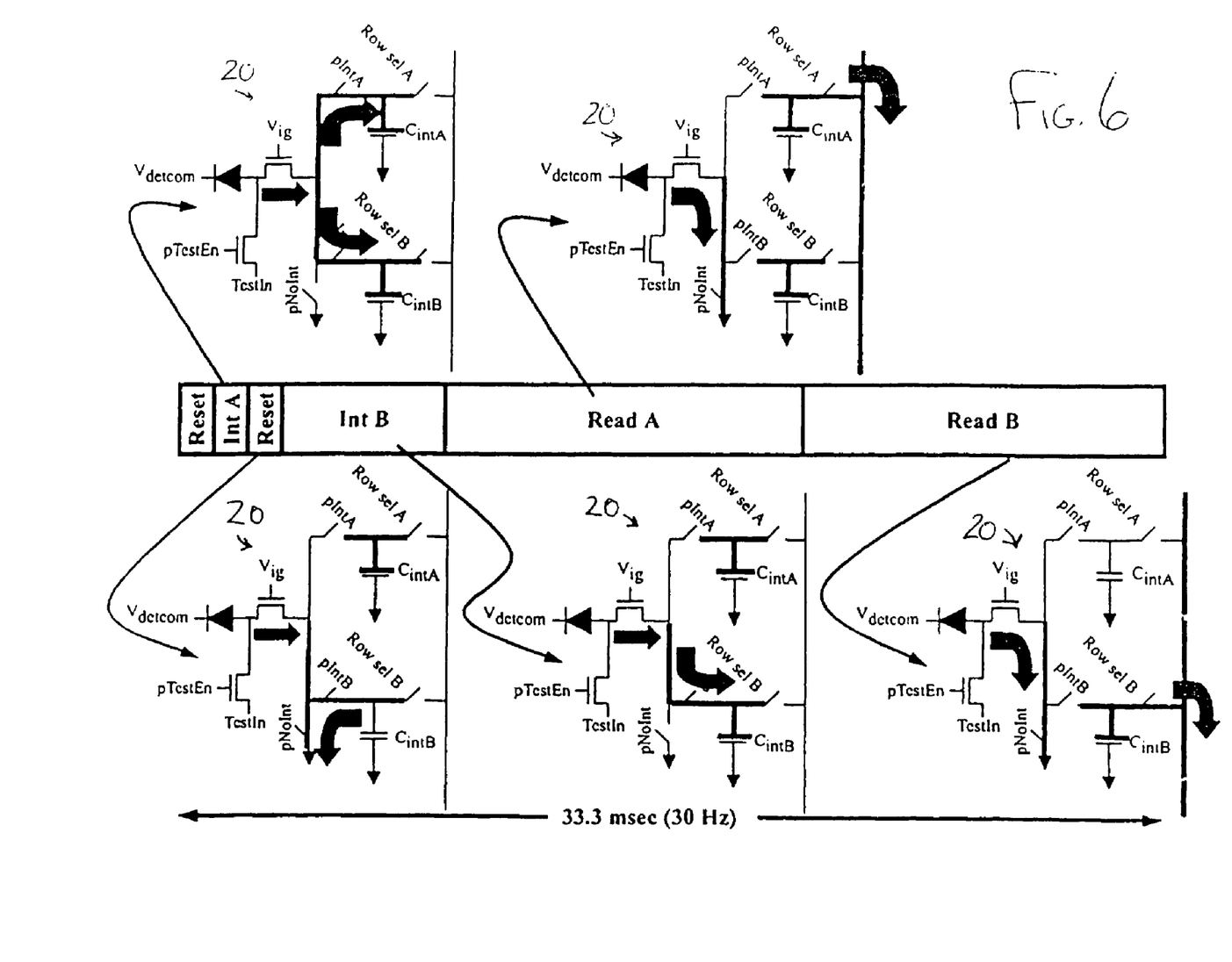
FIG. 6 is a diagram that illustrates the use of the DI input circuit of FIG. 3 in a high capacity, dual integration integrate-then-read mode of operation.

FIG. 6 is a diagram that illustrates the use of the DI input unit cell circuit 20 of FIG. 3 in a high capacity, dual integration ITR mode of operation. This mode is useful when a higher charge capacity is desired for one of the two samples in the ITR mode, as both integration capacitors are used together and are charged in parallel from D1. In this non-limiting and exemplary case, combining both integration capacitors increases the charge storage capacity to over $40 \times 10^6$ electrons. Dual integration is still possible to obtain, as only one of the two charge samples need be read out, and the other integration capacitor can be reset and used to acquire another integration sample. In the example illustrated in FIG. 7 charge is initially stored onto both $C_{intA}$ and $C_{intB}$. Assuming an exemplary 100 microsecond Int_A integration period, this mode allows a flux of greater than, as a non-limiting example, $6.5 \times 10^{16}$ photons/cm² to be integrated without saturation. The charge stored on one of the integration capacitors (e.g., the charge stored on $C_{intA}$) is saved while the charge stored on $C_{intB}$ is reset (transistors pIntB and pNoInt 30 and 36 are closed and transistor pIntA 28 is opened). Then, during the higher gain and longer integration period Int_B, transistor pIntB 30 is closed to allow the second sample to be integrated onto $C_{intB}$. The output multiplexer is then operated twice to first readout $C_{intA}$ (during period Read_A), and then readout $C_{intB}$ (during period Read_B), as was discussed above with respect to FIGS. 4 and 5.

Figure 7:
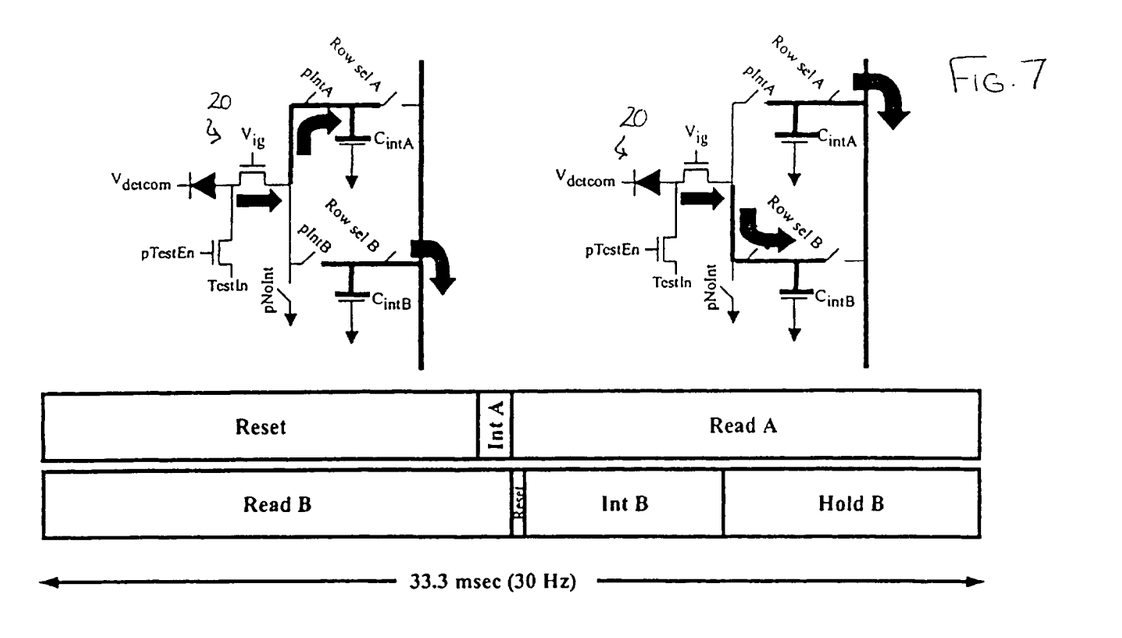
FIG. 7 is a diagram that illustrates the use of the DI input circuit of FIG. 3 in a minimal latency, dual integration integrate-while-read (IWR) mode of operation.

In the IWR mode of operation, the two capacitors are used in a ping-pong fashion to allow the integration and the readout periods to be overlapped, as in the embodiment shown in FIG. 7. While photocurrent is being integrated on $C_{intA}$, the charge stored on $C_{intB}$ is read out, and vice versa. The two integration periods can be timed so that the latency between the two samples is small (e.g., less than about 10 microseconds).

Figure 8:
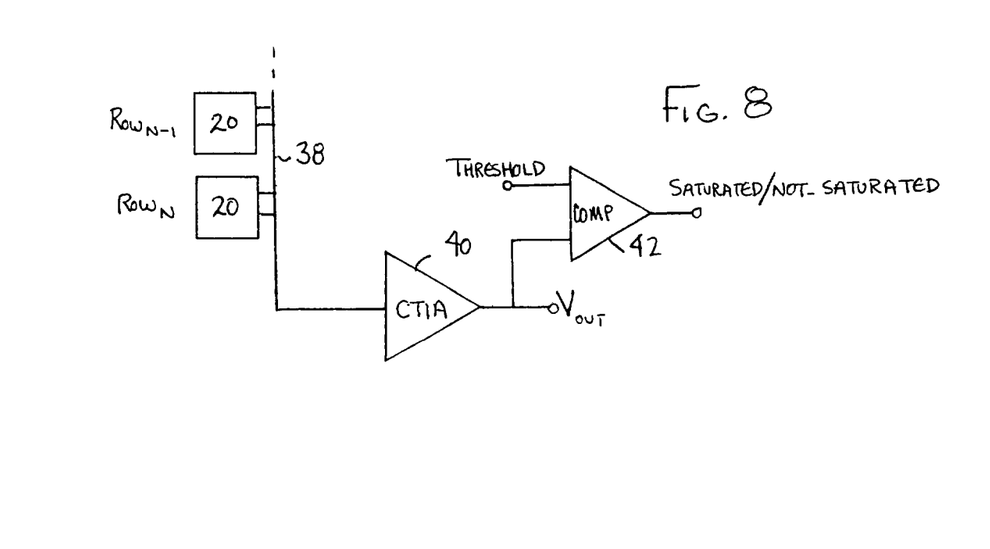
FIG. 8 shows the use of an optional per-column threshold detector and signal sample selection logic.

Referring to FIG. 8, where one sample represents a high gain signal and the other sample represents a lower gain signal, where the ratio of the integration times can be considered the gain ratio if $C_{intA}$ and $C_{intB}$ are equal in value, then a decision circuit can be used to detect a saturation condition in the high gain sample, allowing the lower gain sample to be selected for use. As an example, assume a plurality of the unit cells 20 coupled to the vertical column line 38 feeding the input of a CTIA 40. The output of the CTIA 40 is a voltage ($V_{OUT}$) having a magnitude that is indicative of the amount of integrated photocurrent currently read out of one of $C_{intA}$ or $C_{intB}$ of a unit cell 20 of a currently selected row of unit cells. In this case the decision circuit may be embodied as a voltage comparator 42 for comparing $V_{OUT}$ with some threshold voltage (fixed or programmable). The output of the comparator 42 indicates one of a saturated or a not-saturated condition, depending on whether $V_{OUT}$ is less than or equal to or grater than the threshold voltage. If a saturated condition is indicated then the high gain sample can be discarded, and the lower gain sample used instead by downstream signal processing circuitry.

Figure 9A:
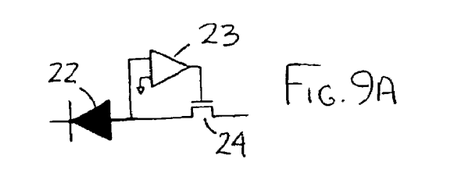
FIG. 9A shows an embodiment where the input circuit is constructed as a buffered direct injection (BDI) or feedback enhanced direct injection (FEDI) circuit.

While described in the context of presently preferred embodiments, those skilled in the art should appreciate that this invention is not limited for use with only these disclosed embodiments. As an example, FIG. 9A shows an embodiment where the input circuit is constructed as a buffered direct injection (BDI) or feedback enhanced direct injection (FEDI) circuit. This type of input circuit employs a feedback amplifier 23 to bias the gate of the injection transistor 24 in order to obtain a more stable detector bias voltage as the photodiode 22 output current increases. As another example, more than two integration capacitors may be employed per unit cell 20, with a corresponding increase in the number of transistor switches. This can be seen in the embodiment of FIG. 9B, which is a diagram of the detector 22, the input circuit (shown generically as an input circuit 24A, e.g., the injection transistor 24 embodiment of FIG. 3 or the FEDI embodiment of FIG. 9A) and N integration capacitors connected to one column busline 38.

Figure 9B:
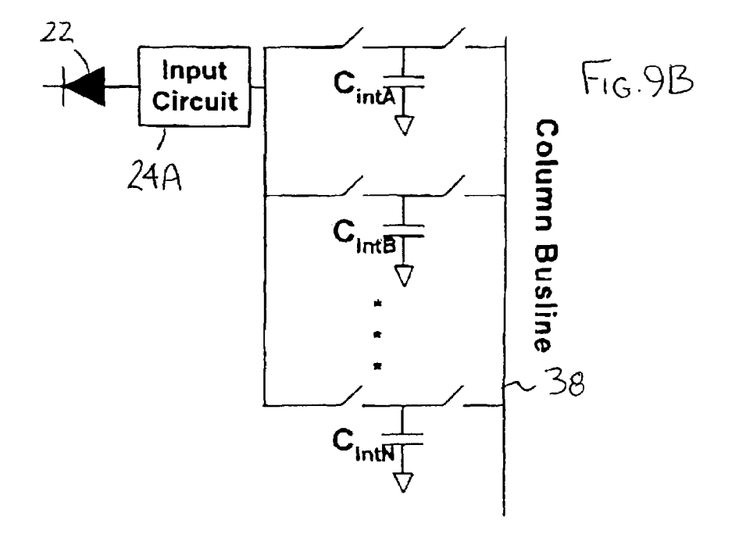
FIG. 9B is a diagram of the detector, input circuit and the integration capacitors connected to one column busline.
Figure 10:
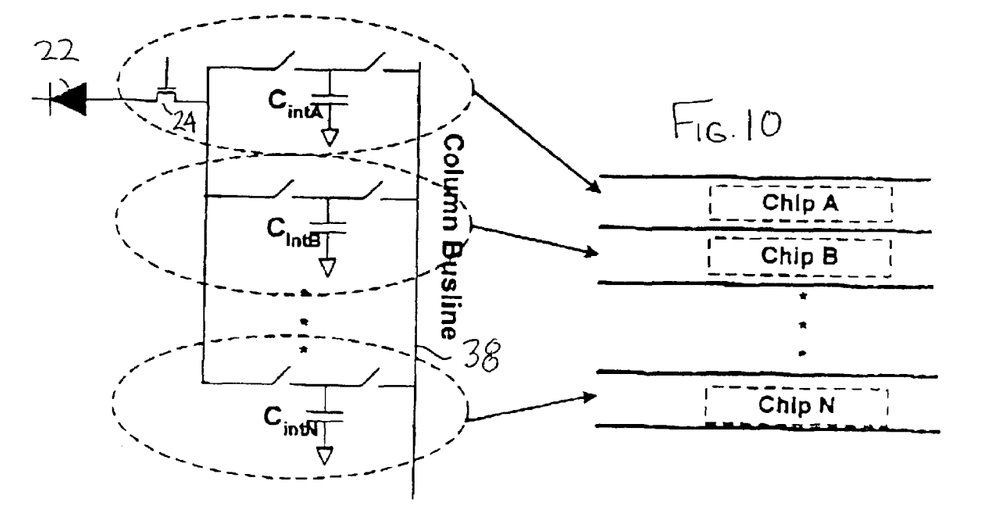
FIG. 10 shows an embodiment where the integration capacitors of FIG. 9B are disposed in a plurality of integrated circuit chips that are stacked one upon another.

Further, this invention should not be construed as being limited to any of the above-mentioned integration periods, or frame times, or component values, or charge storage capacities. The use of the unit cell 20 is also not restricted to two dimensional arrays of unit cells, as linear unit cell arrays can benefit from this invention as well, as can individual unit cell embodiments. The unit cell 20 can be constructed using CMOS processes, or any desired integrated circuit fabrication process. Furthermore, FIG. 10 shows an embodiment where, as an example, the N integration capacitors of FIG. 9B are disposed in a plurality (N) of integrated circuit chips 50 that are stacked one upon another in a three dimensional (3D) manner. In this embodiment the interconnections between the chips 50 can be made using any suitable vertical interconnection means, such as Indium bump technology, solder balls, or plated metal vias.

Figure 11A:
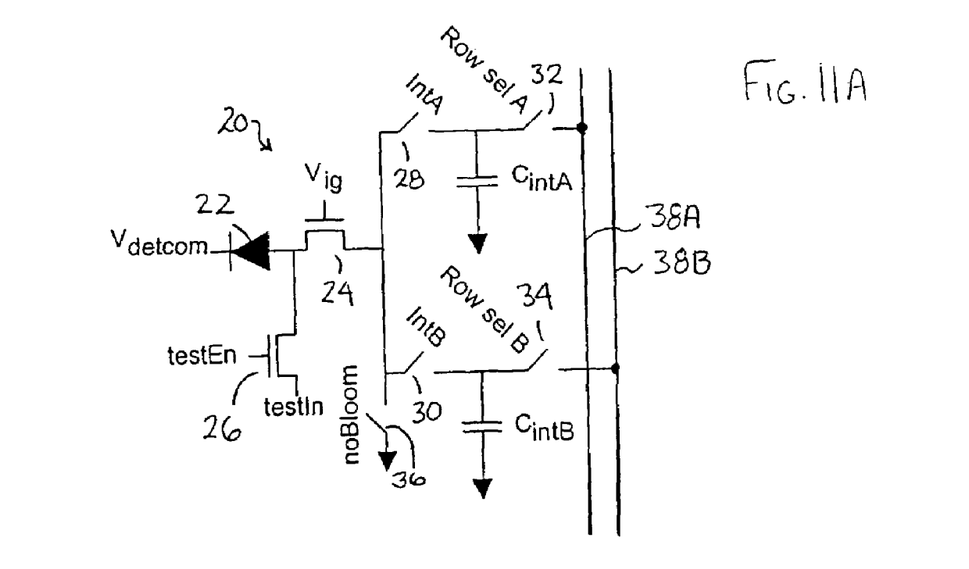
FIG. 11A shows a multi-mode input circuit embodiment with independent output bus lines.
Figure 11B:
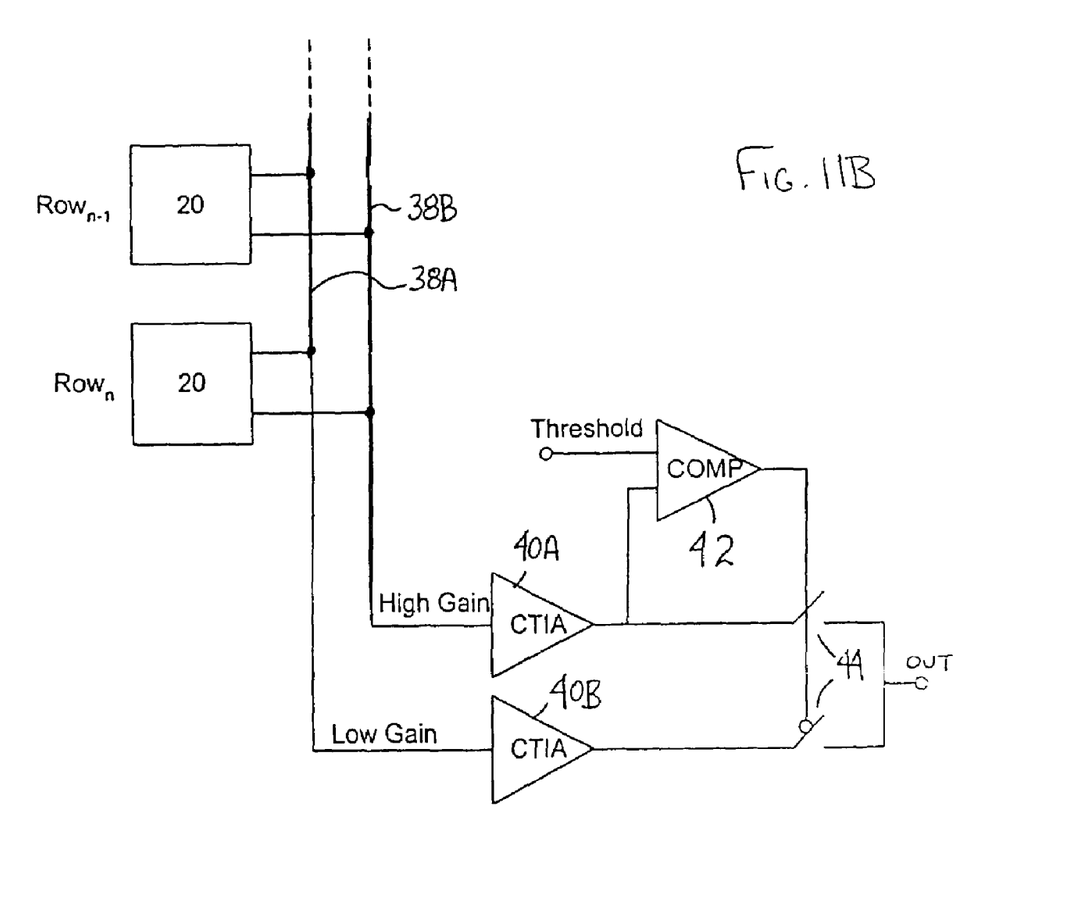
FIG. 11B is a schematic diagram showing how the use of the independent column bus lines of FIG. 11A allows both high and low gain samples to be read out simultaneously.

It is also within the scope of this invention to provide a column comparator to select the high or low gain signal values from the unit cells 20. For example, FIG. 11A shows a multi-mode input circuit embodiment with independent output bus lines 38A and 38B, and FIG. 11B illustrates the use of the independent column bus lines 38A, 38B to enable both high and low gain samples to be read out simultaneously. In this embodiment the two unit cell output transistors 32 and 34 are connected to the separate column bus lines 38A and 38B, respectively. The charge stored on $C_{intA}$ and $C_{intB}$ may then be read out simultaneously by the readout multiplexer with the use of a dedicated column CTIA 40A, 40B for each bus line 38A, 38B, respectively. The comparator 42 is then arranged to compare the signal stored on $C_{intB}$ (assumed for this case to be the high gain, longer integration time signal) to the threshold, and its output then selects, via multiplexer transistors 44, which CTIA output to connect to additional, downstream circuitry. If the column-based comparator 42 senses a saturation condition on the high gain sample, the low gain sample is automatically selected. The simultaneous reading of both unit cell capacitors can decrease the read time in the integrate-then-read (ITR) mode by about a factor of two.

In view of the foregoing, it should be realized that this invention should be accorded a scope that is at least commensurate with the elements of the following claims, and equivalents thereof.

What is claimed is:

1. A method for operating a unit cell, comprising:
   inputting photocurrent to an input node that is coupled to an output of a detector of electromagnetic radiation;
   integrating said photocurrent during a first integration period on a first capacitor that is switchably coupled to said input node;
   integrating said photocurrent during a second integration period on a second capacitor that is switchably coupled to said input node; and
   selectively coupling said first capacitor to an output signal line during a first readout period for reading out the integrated charge on said first capacitor, and selectively coupling said second capacitor to said output signal line during a second readout period for reading out the integrated charge on said second capacitor;
   where in one mode of operation during a frame period a duration of said first integration period is one of greater than or less than said second integration period such that said first integration period is one of a higher gain integration period or a lower gain integration period, relative to said second integration period, respectively, and where said higher gain integration period is split into two periods separated by said lower gain integration period.

2. A method as in claim 1, where said first and second integration periods, and said first and second readout periods, occur within the one frame period.

3. A method as in claim 1, where said first integration period is non-overlapping with said second integration period.

4. A method as in claim 1, where in another mode of operation said first integration period is overlapping with said second integration period.

5. A method as in claim 1, where in another mode of operation said first and second capacitors are switchably coupled to said input node during an integration period for simultaneously receiving and integrating the same charge signal from said detector.

6. A method as in claim 1, where said detector comprises a detector of infrared radiation.

7. A method as in claim 1, where said detector comprises a detector of visible radiation.

8. A method as in claim 1, where said unit cell is one of a plurality of unit cells of an array of unit cells, where said array is a two dimensional array comprised of rows and columns, where said output signal line comprises a column output signal line, and further comprising converting a readout charge signal appearing on said column output signal line to a voltage.

9. A method as in claim 1, further comprising detecting whether a readout charge signal output during the first readout period exceeds a threshold indicating a saturation condition, for enabling a readout charge signal output during the second readout period to be selected for use.

10. A method as in claim 1, further comprising selectively resetting one or more of said input node and said first and second capacitors by selectively coupling one or more of said input node and said first and second capacitors to a reset voltage.

11. A method as in claim 1, where the input node is comprised of one of a direct injection transistor circuit, a buffered direct injection transistor circuit and a feedback enhanced direct injection transistor circuit.

12. A unit cell, comprising:
   an input node for coupling to an output of a detector of electromagnetic radiation, said input node comprising an injection transistor circuit configured to establish a bias for the detector;
   a first capacitor switchably coupled to said input node for receiving a charge signal from said detector and for integrating said charge signal during a first integration period;
   a second capacitor switchably coupled to said input node for receiving a charge signal from said detector and for integrating said charge signal during a second integration period; and
   an output multiplexer for selectively coupling said first capacitor to an output signal line during a first charge signal readout period, and for selectively coupling said second capacitor to said output signal line during a second charge signal readout period,
   where said unit cell comprises a part of an array of unit cells, where the first integration period has a first duration, where the second integration period has a second duration that is less than the first duration, where said output signal line comprises a first output signal line and a second output signal line and where said output multiplexer couples said first capacitor to said first output signal line during the first charge signal readout period and couples said second capacitor to said second output signal line during the second charge signal readout period, where the first and second charge readout periods occur simultaneously, and further comprising a first amplifier having an input coupled to said first output signal line, a second amplifier having an input coupled to said second output signal line, a comparator for comparing an output of said first amplifier to a saturation threshold signal, and an output multiplexer, coupled to an output of said comparator, for selecting one of the output of said first amplifier or an output of said second amplifier to be coupled to further circuitry.

* * * * *